No. 891,236. PATENTED JUNE 23, 1908.
J. DILLON.
ELECTRIC MOTOR CONTROLLER.
APPLICATION FILED JUNE 24, 1904.

4 SHEETS—SHEET 2.

Witnesses
Geo W Young
N.E. Oliphant

Inventor
John Dillon
By H.G. Underwood
Attorney

No. 891,236. PATENTED JUNE 23, 1908.
J. DILLON.
ELECTRIC MOTOR CONTROLLER.
APPLICATION FILED JUNE 24, 1904.
4 SHEETS—SHEET 3.
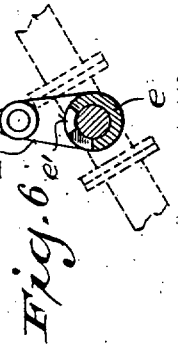
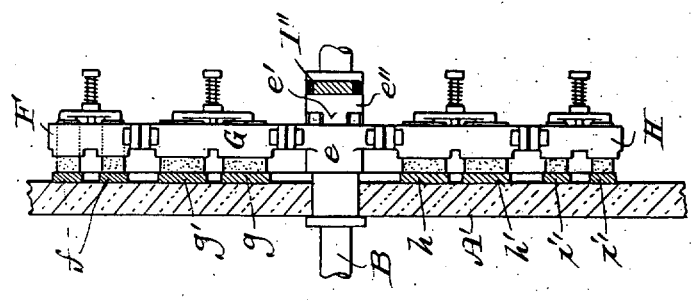
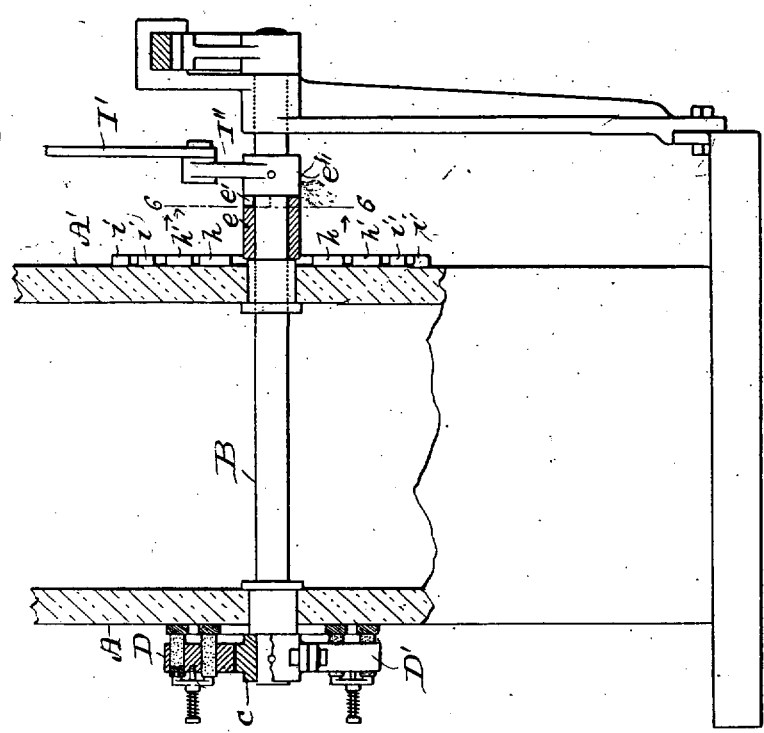

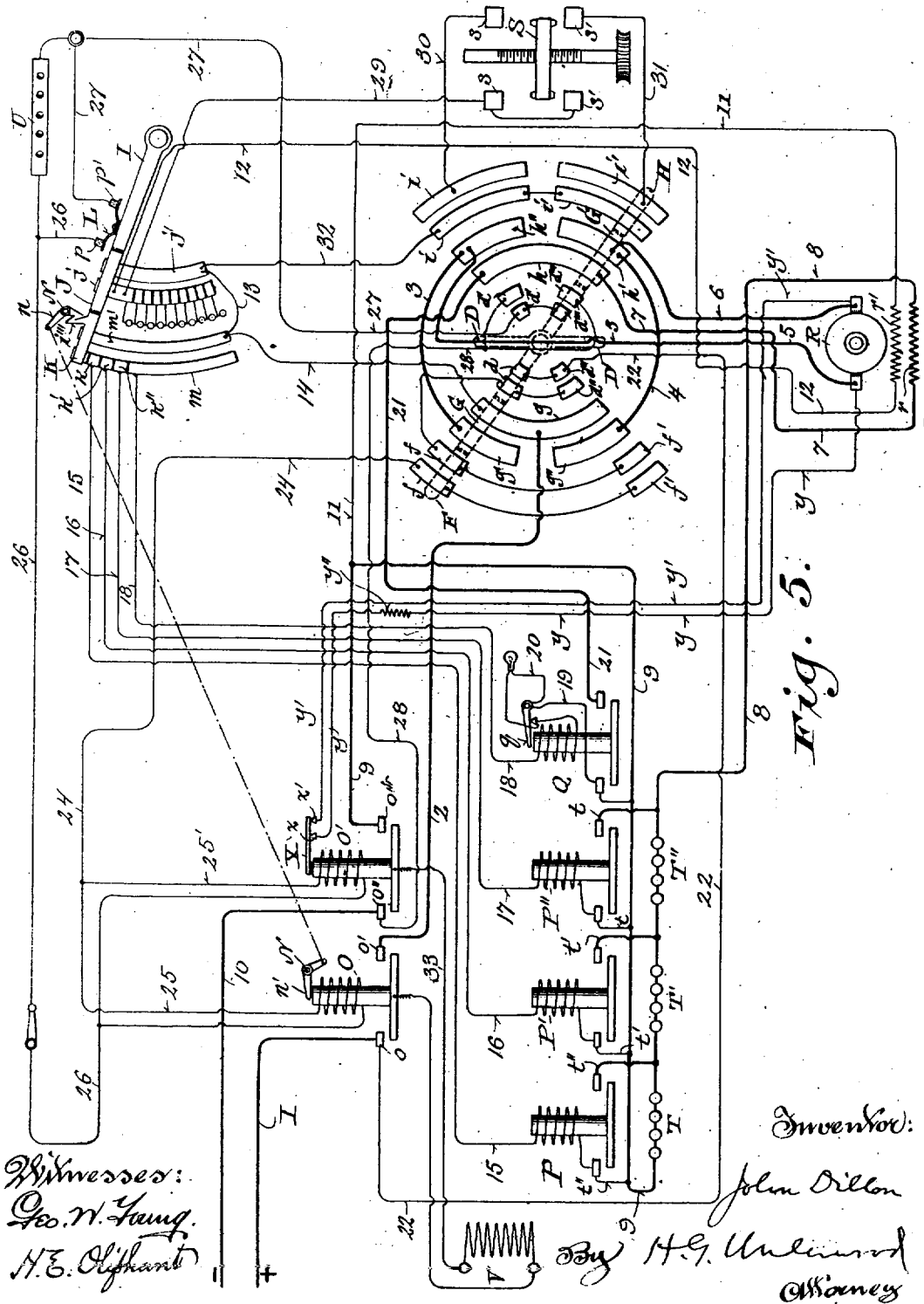

UNITED STATES PATENT OFFICE.

JOHN DILLON, OF MILWAUKEE, WISCONSIN, ASSIGNOR TO THE BARTH ELEVATOR COMPANY, OF MILWAUKEE, WISCONSIN, A CORPORATION OF WISCONSIN.

ELECTRIC-MOTOR CONTROLLER.

No. 891,236.  Specification of Letters Patent.  Patented June 23, 1908.

Application filed June 24, 1904. Serial No. 213,973.

*To all whom it may concern:*

Be it known that I, JOHN DILLON, a citizen of the United States, and resident of Milwaukee, in the county of Milwaukee and State of Wisconsin, have invented certain new and useful Improvements in Electric-Motor Controllers; and I do hereby declare that the following is a full, clear, and exact description thereof.

My invention has for its object to provide a safe and absolutely reliable means for controlling an electric motor in various applications of the same, especially when the motor is subjected to frequent starts, stops and large powers, the controller constituting said invention being especially useful in conjunction with electric-elevator mechanism and its motor to govern start, stop, reverse and running speed of the elevator-car from which said controller is operated.

In view of the foregoing, my invention consists in what is hereinafter particularly set forth with reference to the accompanying drawings and subsequently claimed.

Figure 1:
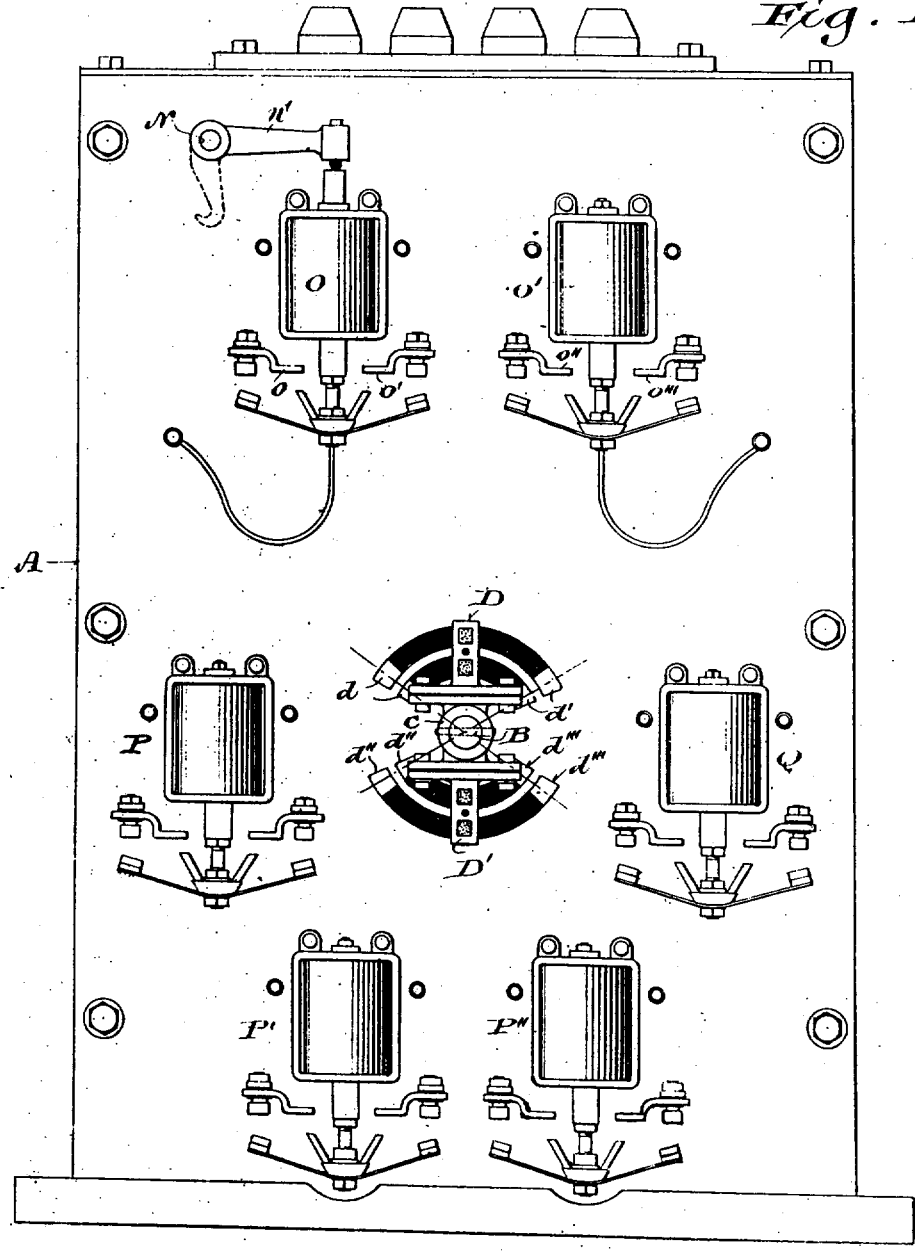
Figure 2:
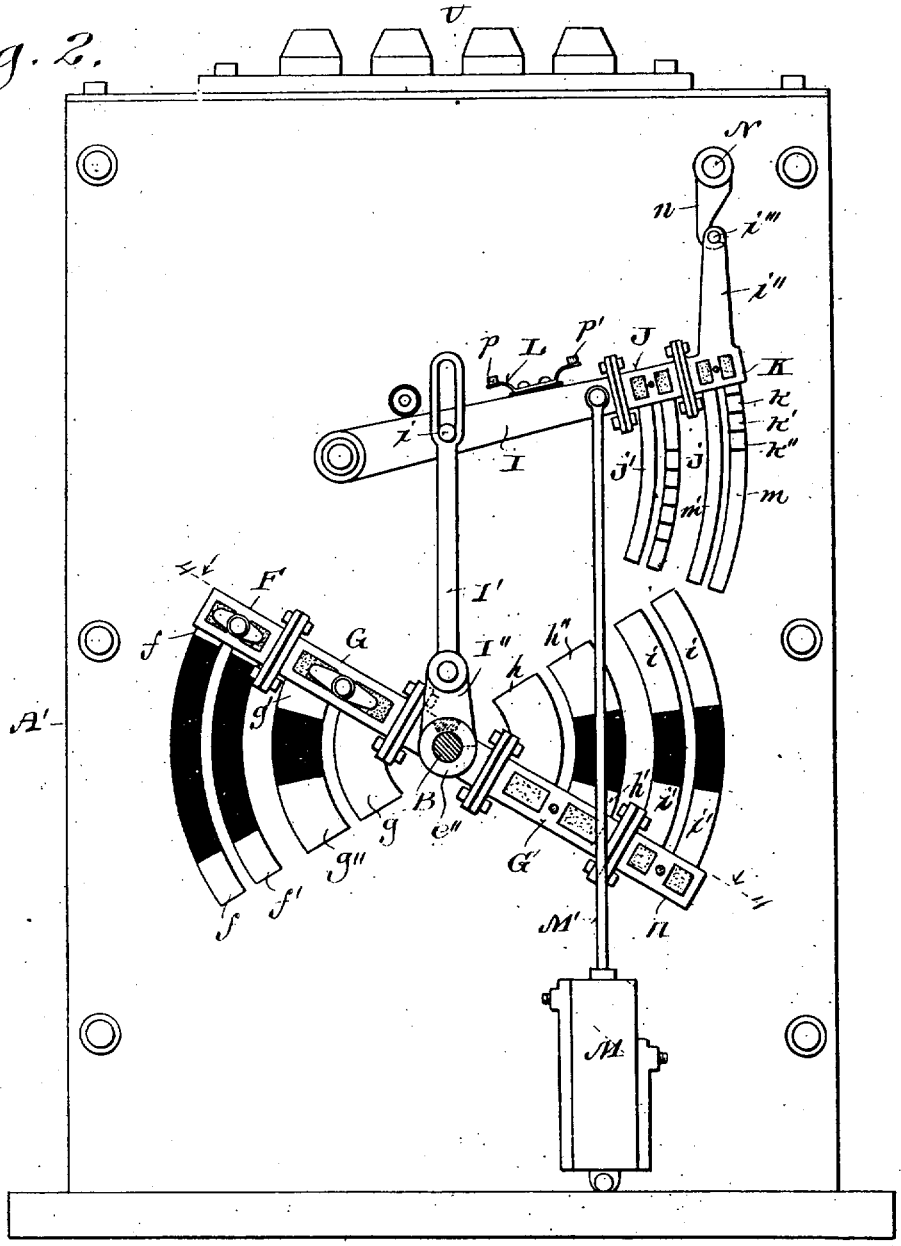

Figure 1 of the drawings represents an elevation of one side of an electric-motor controller in accordance with my invention; Fig. 2, an elevation of the other side of the controller; Fig. 3, a partly sectional view of a fragment of the controller; Fig. 4, a detail sectional view indicated by line 4—4 in Fig. 2; Fig. 5, a diagram illustrating said controller in connection with an electric-motor, and Fig. 6, a detail view indicated by line 6—6 in Fig. 3.

Referring by letter and numeral to the drawings, A A', indicate front and rear walls or slabs of a base structure, the same being preferably of insulating material through which extends a rock-shaft B that is actuated by any suitable means. In the preferred application of my invention, the rock-shaft is connected in any suitable manner to an operating device in the elevator-car to be under control of the operator in said car, and said rock-shaft controls the movable elements of various switches.

Rigid on the rock-shaft or otherwise arranged in connection therewith, to have movement with the same in proximity to the wall A of the base structure, is a switch-arm divided longitudinally into three sections insulated one from another and constituting with its adjacent contacts what is herein termed the primary switch. The arm-sections are respectively indicated by D, c, D', the section c being a hub engaged by the rock-shaft, and the other sections D, D', are blades alined in opposite directions from the hub. The contacts associated with the primary-switch arm are on the wall A of the base-structure in pairs $d\,d$, and $d'\,d'$, in the arc of movement of the blade D, and pairs $d''\,d''$, and $d'''\,d'''$ in the arc of movement of the blade D'. Each blade closes on both contacts of either pair associated therewith.

Supported on the rock-shaft B in proximity to the wall A' of the base-structure is the movable arm of what is herein termed the reversing-switch, but which in effect is an association of switches, and said arm comprises five alined sections indicated by F, G, $e$, G' and H, insulated one from another, the section $e$ being a hub on said rock-shaft and the other sections are hereinafter termed blades. On the wall A' in the arc of movement of the blade F are two pairs of contacts $ff$ and $f'f'$, adapted to be brought into circuit with the primary-switch, as hereinafter described, said blade being normally closed on one or the other pair of said contacts. The blade G is always closed on an elongated contact $g$ upon the wall A', and separated contacts $g'\,g''$, are on said wall in the arc of movement of said blade. The blade G' is always closed on an elongated contact $h$ upon the wall A' and separated contacts $h'\,h''$ on said wall are in the arc of movement of said blade.

It is to be noted that the angular measurement of the contacts $ff$ and $f'f'$ is less than that of the contacts $g'\,g''$ and $h'\,h''$, so that when the reversing-switch arm is moved from one to the other limit of throw, contact is broken by blade F earlier than by blades G, G', and again established earlier by blades G, G' than by blade F, the object of this result being hereinafter apparent. On the wall A' in the arc of movement of the blade H are two pairs of contacts $i\,i$, and $i'\,i'$, and these contacts in conjunction with devices hereinafter specified constitute a reversible automatic slow-down switch.

A lost motion connection is established between the arm of the primary-switch and that of the reversing-switch. This connection may be had in various ways, one way, as herein shown, being to make the hub of the primary switch-arm fast on the rock-shaft B, and provide the hub of the reversing-switch arm with a segmental play notch engaged by a crank lug e' of a collar e" also fast on said shaft and constituting the hub of a crank I".

The extent of lost motion permitted by the connection of the reversing-switch arm with the shaft B is such that, assuming both the primary and reversing switches to be at one limit of movement, actuation of the primary-switch arm to midposition of its movement does not disturb the reversing-switch arm, so that the latter is moved only during the second half of the movement of the primary-switch arm through its full sweep.

I indicates a time-switch arm pivotally mounted on the wall A' and provided with two blade portions J and K, herein shown insulated from each other and arranged to sweep over independent sets of contact-devices. The contact-segments associated with blade J comprise a resistance series j and a continuous segment j', constituting with said blade a rheostat. The contact-segments associated with blade K are three plates k k' k", arranged to be swept over by the time-switch-arm before it commences its passage over the points of resistance series j, a relatively long plate m in alinement with the plates k k' k", and a parallel continuous plate m'.

L indicates a bridge carried by the time-switch arm I and arranged when the arm is in a raised inactive position to make electrical connection between two stationary contact points p p'.

Means are provided for insuring the return of the time-switch arm to raised or inactive position each time the motor device is stopped, and for occasioning automatically the excursion of said arm to operating position when the motor is started. With reference to Fig. 2, wherein I have shown an arbitrary weight-impelled time-switch, the arm I thereof is provided with a lateral projection i with which engages the longitudinally slotted end of a link-rod I' the lower end whereof is pivoted to the crank I", fast upon the shaft B.

M indicates a dash pot, the plunger whereof is connected by rod M' to the time-switch-arm I, and i" indicates a branch of said arm provided with a pin i''' with which is adapted to engage a hook n mounted on a rock-shaft N extending through the boards A, A', and provided on its opposite extremity with a crank arm n', associated with a movable member of one of the main line relay-switches O, to be described, so that when the movable elements of said relay-switch is brought to circuit closing position, the crank arm n' is moved to actuate the hook to releasing position. The slotted end of link I' forms a stop, adjustable by the car operator, to control the extent of downward movement of the arm I.

The arrangement described is such that the time-switch arm I makes its sweep in a predetermined, arbitrary time, but said arm may, if desired, be associated with the electric-motor devices so that its sweep is made in a time positively consistent with that taken by the motor in speeding up from a standstill to full speed, or a time positively consistent with the development of the full counter-electro-motive-force of the motor armature. Such devices would obviously be mere equivalents of the construction shown.

Insulation between J and K is not necessary with the wiring shown, but as it is essential in some cases to leave the current on the shunt-field of a motor to assist in a quick start of the motor, the field connections will differ somewhat from these shown, and the insulation aforesaid will be necessary to derive the full benefit from the field resistance.

Mounted upon the wall A are one or more main line relay-switches, of which I have shown two, O and O', one or more resistance cut out relay-switches, of which I have shown three, at P, P' and P", and a series-field cut-out relay switch Q for a compound wound motor is also shown mounted on said wall. These relay-switches may be of any suitable construction and I have herein shown them all alike, each comprising a solenoid and a core therein carrying two bridge bars one provided with carbon contacts and the other with metallic contact surfaces, arranged for coaction with respective carbon and metallic stationary contact points and normally, or when the solenoids are deënergized, standing in open position. As shown in the diagram Fig. 5, the core of main-line relay-switch O' carries on its upper end a bridge bar X arranged, when the relay is deënergized and the core down, to close circuit through two contacts x and x'. In said diagram it is shown that the series field cut-out relay Q is preferably associated with a single throw switch q, so that when the solenoid of this relay is energized, the core or stem of same moves the switch q from position of contact with its front contact.

In operation, the devices described are associated with a motor R, and the automatically reversing slow-down switch, above mentioned, comprises a movable bridge S associated with an electric elevator-engine in such a way that it reaches position for contact with its respective front and back pairs of contacts s, s and s' s' just before the elevator-car reaches its respective upper and lower terminal landings.

Referring now to Fig. 5, it will be seen that the main line circuit may be traced as follows; Commencing at the left with the positive wire that in practice has connection with a suitable source of electrical supply, not shown, the circuit may be traced by wire 1 to contact-point o of main-line relay-switch O, and from the other contact-point o' of said main line relay-switch by wire 2, to the contact $g$ of the motor-reversing portion of the reversing-switch, when relay switch O is closed. The short contacts $g'$ and $h''$ on opposite sides of the reversing-switch are connected by wire 3, and the remaining short contacts $g''$ and $h'$ are connected by wire 4. The connected contacts $g'$, $h''$ and $g''$, $h'$, are connected respectively by wires 5 and 6 to the left and right brushes of the motor R.

From the long contact $h$ extends a wire 7 connected to the series field windings $r$ of the motor R from which the circuit continues by wire 8 through a series of arbitrary starting resistances T″ T′ and T and thence by wire 9 to the contact point $o''$ of the main line relay-switch O′ and from the opposite contact-point $o'''$ thereof, when closed, by wire 10 to the source of electrical supply.

When the reversing-switch arm bridges contact segments $g\ g'$ and $h\ h'$ and the main line circuit is closed by the relay-switches O and O′, current will flow to the motor R over wires 1, 2, 3, 5, entering said motor at the left brush, and will return by wires 6, 7, 8, 9, 10, while if the reversing-switch arm be thrown to its other limit of movement so that its blades G and G′ bridge the contacts $g\ g''$ and $h\ h''$ current will flow through said motor from the right brush to the left thereby reversing its direction of rotation.

The motor R is compound wound, its shunt field $r'$ having one end connected to the wire 9 by wire 11 and its other end connected by wire 12 to the upper end of resistance series $j$ of the rheostat element of the time-switch. The continuous segment $j'$ of the rheostat is connected by wire 13 with segment $m'$ of the time-switch which in turn is connected by wire 14 to reversing-switch contact $g$ forming part of the main line circuit. It will be apparent now that when the time switch arm I is in elevated initial position, no arbitrary extraneous resistance is in the shunt-field circuit, but when the said arm is released and travels down over its contact points, it cuts resistance into the shunt field circuit, thereby weakening the field of force in the motor and enabling the latter to speed up. The motor-brushes are connected by wires $y$ and $y'$ respectively with contacts $x$, $x'$, of the circuit-closer carried by relay switch O′, so that when the relay is deënergized the motor is short-circuited. A resistance $y''$ is preferably included in wire $y$.

I have provided for cutting out successively the resistances T, T′, and T″ by providing a normally open short-circuit around each of the said resistances, as indicated at $t$, $t'$, and $t''$, and arranging the resistance cut-out relay switches P, P′, and P″, to successively close said shunt circuits. I also arrange the series-field cut-out relay-switch Q in a circuit such that when said relay is energized it provides a short-circuit around the series field $r$ of the motor R and all of the resistance T, T′ and T″.

To provide for successively energizing the resistance cut-out relays P, P′ and P″, the segments $k\ k'$, and $k''$ of the time-switch are connected respectively by wires 15, 16, and 17, with the solenoids of relays P, P′ and P″, the opposite terminal of each of said solenoids being connected with that portion of the corresponding cut-out shunt $t$, $t'$ or $t''$ which is connected with the main line wire 9. The continuous contact segment $m'$ of said time-switch, is connected, as heretofore described, by wire 14 with the reversing-switch contact $g$, which it will be remembered is directly connected with the positive side of the main line circuit. Hence it is apparent that as the time-switch arm I descends, it successively connects the wires, 15, 16, and 17, with the wire, 14, thereby successively completing the circuit through the solenoids P, P′, and P″, to likewise cut out the resistance T, T′, T″.

The contact segment $m$ of the time-switch series is connected by wire 18, to the solenoid of the series field cut-out relay Q, and a pivotal gravity switch-blade $q$ is normally closed on a contact terminal of said solenoid to be in the lifting path of the bridge-core of said relay. The solenoid contact is connected to wire 20 containing in series therewith a lamp or other resistance and this wire is connected to the switch-blade $q$ that is also connected, by wire 19, to one of the contacts of the relay Q. This contact of the relay is connected to the wire 9 and the other contact of said relay is connected by wire 21 with the reversing-switch contact $h$, which, it will be noted is directly connected to the wire 7. When the switch-blade $q$ is down, the lamp or other resistance aforesaid is cut out, but when said blade is lifted said resistance is cut in.

It will be apparent that before the time-switch arm I completes its sweep, it contacts with the segment $m$ and includes the solenoid of the series field cut-out relay Q, in a shunt between wires 2 and 9, which may be traced, as follows: wire 2, contact $g$, wire 14, segment $m'$, segment $m$, wire 18, solenoid of relay-switch Q, switch $q$, wire 19, back to wire 9. The solenoid bridge-arms close on the contacts of said relay and establish a short circuit between wires 7 and 9, through the contact $h$, wire 21, relay bridge, and wire 19 to the wire 9. This short-circuit, it will be seen, cuts out of the main-circuit the series-field winding $r$ of the motor, and all of the resistance T, T′ and T″. The relays O and O′ are arranged in a derived-circuit controlled by the primary-switch arm, connections being made as follows: 22 indicates a wire extending from wire 1 to and including the inner contacts $d''\ d$, of the primary-switch. The corresponding contacts $d''$ and $d$ of the respective pairs are connected together and (by the wire 23) to the inner connected contacts $f, f'$, of the reversing-switch. The connected outer contacts $f'$ and $f$ of the reversing-switch are connected to wire 24 which divides into two branches 25 and 25', including respectively the windings of solenoids of the relays O and O' in parallel, and from the point of reunion of the branches 25, 25' extends wire 26 to the contact $p$ associated with the bridge piece L carried by the time-switch arm I, but insulated therefrom. The remaining contact $p'$ is connected by wire 27 with both of the inner connected primary-switch contacts $d'$ and $d'''$, and the other connected contacts of the pairs $d'''$ and $d'$ are connected by wire 28 with the wire 10. A resistance U is connected between the wires 26 and 27.

If the primary-switch arm be thrown to circuit closing position in relation to either of its pairs of contacts, and the reversing-switch arm is in position to bridge its contacts $ff$, or $f'f'$, the derived circuit is closed across the main line wires 1 to 10 to include, in parallel, the solenoids of the relays O and O' which latter are energized to cause their bridge pieces to complete the circuit through the main line. It will here be noted that when the actuating shaft B is moved to reverse the motor, the derived-circuit for the relays of the main line is opened when the blade F of the reversing-switch arm clears contacts $f$ or $f'$, and is not again closed until said arm again bridges one or the other pair of said contacts. Hence the contacts of the reversing-switch are never burned out.

It will be remembered that the construction illustrated is such that the lifting of the solenoid core of the relay O trips the hook $n$ (which ordinarily maintains the time-switch arm I against movement) thereby releasing said arm so it is able to descend under the influence of gravity over its contact devices. Consequently the derived circuit is broken between the points $p$ and $p'$, and current flows through the resistance U. By this means it will be apparent that I am enabled to supply a relatively strong current to the solenoids of the main line relay-switches to actuate them to closed position and then reduce the current supply to relatively small amount just sufficient to maintain the relays in closed position. It will also be remembered that the mechanical arrangement is such that the movement of the primary-switch arm from one circuit closing position to another likewise actuates the reversing-switch arm, so that current is supplied to the motor and the latter started whenever both of said arms are in circuit-closing position and the time-switch arm lifted to short-circuit the resistance U. It will be apparent that the descent of the time-switch arm I over its associated contact devices, (whether said arm be actuated by connection with the motor or in the arbitrary mechanical manner herein suggested) closes in succession the various sub-circuits to successively energize the resistance cut-out relays P, P', P'', so that the latter successively close the short circuits controlled thereby to cut out the starting resistances T, T' and T'', and then closes the energizing circuit of the series-field cut-out relay Q which cuts out of the main line circuit the series field winding of the motor R. The effect of this arrangement, as will be apparent, is to start the motor first with a heavy safeguarding resistance included in series in the series-field and armature to prevent damage to the motor by too sudden application of current, then to automatically reduce the resistance in said circuit to permit the progressive increase in the quantity of current supplied to the motor and consequently increase its speed, and then to weaken the field of force by the elimination of the field-magnet winding, to further accelerate the speed of the motor. At a suitable time with reference to these actions, the time-switch also begins to cut into the shunt field of the motor resistance, comprising part of the rheostat devices, to further weaken the field-magnet and accelerate the rotation of the motor armature to maximum speed.

Should it be desired to stop the motor, the operator moves the shaft B so that the primary switch arm clears contacts $d \, d'''$ or $d' \, d''$ to thus break the derived circuit. The time-switch arm I is returned to initial position by further movement of the shaft. The operations just specified are done without disturbing the reversing-switch, by virtue of the lost motion connection between the arms of the primary and reversing switches. The breaking of the derived circuit deënergizes the relays O, O', whose bridge-pieces immediately drop, so that relay O restores the hook $n$ to position for engagement with the time-switch arm and the relay O' moves the bridge X into contact with its points $x, x'$, thereby short-circuiting the motor armature. The armature of course continues to rotate by reason of its momentum, but the motor now operates as a generator and, as is well known, exercises a braking effect tending to stop its associated mechanism. It will be noted after a break in the main circuit caused by a movement of the primary-switch arm toward its mid-position, the motor cannot be again started until the time-switch arm has been restored to initial position to cut into the main circuit all of the safe-guarding resistance T, T', T'', and the series field of the motor. This action is due to the fact that when the main circuit is broken by the primary-switch and the bridges of the main line relay-switches O and O' fall away from their contacts, they can not be reattracted to circuit closing position by the small current which passes through the resistance U, of the derived-circuit, and therefore, it is necessary to close the bridge L of the time-switch arm upon its contacts $p$ and $p'$ to short-circuit resistance U before the main line can be closed by its relay-switches. By this means I insure the inclusion in the main line circuit of the series winding of the motor and the safeguarding resistance each time the motor is started. It will be apparent, however, that as a stop connection is provided between the actuating shaft B and the time-switch arm I, the descent of said arm may be stopped, or said arm may be moved back to any point of its excursion over short contact segments of the resistance series $j$ at the will of the operator, and the speed of the motor thereby controlled, the proportions of the contacts of the primary-switch being sufficient to permit the necessary movement of the shaft B to accomplish such adjustment of the time-switch arm, without effecting a rupture of the derived-circuit, or the circuit through relay switch Q.

While the device thus described is a completely operative structure, I prefer to provide in conjunction therewith an automatic slow-down switch, arranged to perform its function as the elevator-car approaches predetermined points—generally the limits of its excursion—and adapted to close a short circuit around the resistance in series with the motor shunt field.

In Fig. 5, 29 indicates a wire connecting the upper segment of the rheostat series $j$ and two contacts $s$ and $s'$ of the slow-down device. The remaining contacts $s$ and $s'$ are connected by wires 30 and 31 respectively, to the outer segments $i$ and $i'$ of the reversing-switch. The inner segments $i$ and $i'$ of said switch are connected together and to the contact-segment $j'$ of the rheostat by wire 32. It will be apparent now that when the bridge S connects a pair of contacts $s$ or $s'$ and reversing-switch blade H is on contacts $i$ or $i'$, current coming through the shunt field circuit upon the time-switch segment $j'$ finds its way to the uppermost section of the resistance segment $j$, by way of the wire 32, reversing-switch blade H, wire 30 or 31, bridge S and wire 29 without passing through the resistance coils of the resistance segment $j$. In this way the strength of the shunt field is increased and the speed of the motor correspondingly slowed down. When the blade H is moved into contact with segments $i, i'$, the short circuit described is broken and the device set for operation when bridge S reaches its other limit of travel. The bridge is shown movable lengthwise of a screw S' driven by any suitable means, and the movement of said bridge in either direction is in time with the movement of the elevator-car.

I also provide in conjunction with my device a brake solenoid V, included in a shunt circuit 33 connected to the bridge pieces of the relays O and O'. In practice this solenoid opposes the action of a spring, tending to normally set the brake so that as long as the main line circuit is closed the brake is thrown off, and when the main line circuit is open the brake is spring applied. The brake mechanism I do not deem it necessary to show.

While I have shown two main line relay switches O and O' in the two legs of the main line circuit, it will be apparent that one of them might be omitted, and that while I have shown three resistance cut out relay-switches P, P' and P" and three resistance coils T, T' and T" in the main line, more or less relay switches and corresponding resistance coils might be employed and connected in accordance with the teachings of my invention. It will also be apparent that numerous other changes in the embodiment of my invention may be made without departing from the spirit and scope thereof.

To summarize it will be seen that in my system I provide a main line circuit normally including in series therein safeguarding starting-resistance and the series field of a compound wound motor, and controlled by one or more main line relay-switches, a derived-circuit including the main line relays and controlled by a primary-switch, relay-switches for cutting out the starting-resistances and the series field of the motor, controlled by an automatic time-switch; a motor shunt field circuit in which resistance may be included by the operation of the time-switch, subsequently to the cutting out of the starting resistances and the motor series field; and a reversing-switch for the motor. I further provide and preferably employ, a device for short-circuiting the motor whenever the main circuit is broken, a reversible, automatic slow-down switch, in conjunction with the reversing switch, and operative to short circuit the resistance interposed in the motor shunt field by the time-switch when the elevator reaches predetermined points in its excursion, and various economizing and safeguarding resistance devices adapted to be included in the series field cut-out relay circuit and the derived main line relay-actuating circuit.

Having thus described my invention, what I claim as new, and desire to secure by Letters-Patent, is:—

1. In an electric-motor controller, a main circuit arranged for connection with the motor, a relay-switch on each side of the motor devices controlling said main circuit, a derived-circuit from the main line circuit including the electro-magnetic elements of said switches, and a primary-switch controlling said derived circuit.

2. In an electric-motor controller, a main circuit arranged for supplying current to the motor armature, a relay-switch controlling the main circuit, and means associated with said relay-switch for short-circuiting the armature when the relay-switch is actuated to open the main circuit.

3. In an electric-motor controller, a main circuit for supplying current to the motor, a relay-switch controlling the main circuit, and a brake solenoid connected to the relay-switch for control thereby.

4. In an electric-motor controller, a main circuit for supplying current to the motor, a relay-switch for controlling the main circuit on each side of the motor devices, and a brake solenoid connected at opposite terminals to the relay-switches to be thereby connected to the main circuit when the latter is closed by the said relay-switches.

5. In combination with a motor having a shunt winding, a main circuit for supplying current to the motor, a motor-reversing switch, a resistance arranged to be included in the shunt field circuit of the motor, a resistance-short-circuiting switch having two sets of contacts, and a short circuit around the resistance controlled by the reversing-switch to include either pair of contacts of the short circuiting switch.

6. In an electric-motor controller, a reversing-switch, and means in conjunction with said switch for automatic predetermined short-circuiting of resistance arranged and connected to be included in the shunt-field of the motor.

7. In an electric-motor controller, a reversing-switch, a time-switch in conjunction with the reversing-switch for cutting resistance into series with the shunt field of the motor, and means also in conjunction with said reversing-switch for automatic predetermined short-circuiting of said resistance.

8. In an electric-motor controller, a reversing-switch in main circuit, a time-switch in circuit through the reversing-switch for cutting resistance into series with the shunt-field of the motor, a primary-switch, and a relay-switch having the electro-magnetic element thereof in a circuit controlled by the primary and reversing switches and operative to make and break the main circuit.

9. In an electric-motor controller, a reversing-switch in main circuit, a time-switch in circuit through the reversing-switch for cutting resistance into series with the shunt-field of the motor, means in conjunction with said reversing-switch for automatic predetermined short-circuiting of said resistance, a primary-switch, and a relay-switch having the electro-magnetic element thereof controlled by the primary and reversing switches and operative to make and break the main circuit.

10. In an electric-motor controller, a reversing-switch in main circuit, a time-switch in circuit through the reversing-switch, starting-resistance relay-switches having their electro-magnetic elements in circuits through the reversing and time-switches, a primary-switch, another relay-switch having its electro-magnetic element in a circuit controlled by the reversing and primary switches and operative to make and break the main circuit, and resistance arranged and connected to be cut into series with the shunt-field of the motor by said time-switch.

11. In an electric-motor controller, a reversing-switch in main circuit, a time-switch in circuit through the reversing-switch, starting-resistance relay-switches having their electro-magnetic elements in circuits through the reversing and time switches, a primary-switch, another relay-switch having its electro-magnetic element in a circuit controlled by the reversing and primary switches and operative to make and break the main circuit, a resistance in a short-circuit with the circuit of the last aforesaid relay-switch, means in conjunction with the time-switch for making and breaking said short-circuit, and resistance arranged and connected to be cut into series with the shunt-field of the motor by said time-switch.

12. In an electric-motor controller, a reversing switch in main circuit, a time-switch in circuit through the reversing-switch, starting-resistance relay-switches having their electro-magnetic elements in circuits through the reversing and time switches, a primary-switch, another relay-switch having its electro-magnetic element in a circuit controlled by the reversing and primary switches and operative to make and break the main circuit, a resistance in short-circuit with the circuit of the last aforesaid relay-switch, means in conjunction with the time-switch for making and breaking said short circuit, latch-mechanism for holding the movable element of the time-switch in initial position to close the aforesaid short-circuit, means for releasing the latch-mechanism coincident with closing of the main-circuit, and resistance arranged and connected to be cut into series with the shunt-field of the motor by said time-switch.

13. In an electric-motor controller, a reversing-switch in main circuit, a time-switch in circuit through the reversing-switch, starting-resistance relay-switches having their electro-magnetic elements in circuits through the reversing and time switches, a primary-switch, another relay-switch having its electro-magnetic element in a circuit controlled by the reversing and primary switches and operative to make and break the main circuit, a resistance in short circuit with the circuit of the last aforesaid relay-switch, means in conjunction with the time-switch for making and breaking the short-circuit, resistance arranged and connected to be cut into series with the shunt-field of the motor by said time-switch, and means in conjunction with said reversing-switch for automatic predetermined short circuiting of the shunt-field resistance.

14. In an electric-motor controller, a main circuit, a relay-switch a circuit for the electro-magnetic element of said relay-switch, a primary switch operative independently of the motor reversing switch to control the last said circuit, and a second switch for the last said circuit arranged relative to the motor reversing switch to open its circuit prior to the operation of said motor reversing switch to reverse the connections of the motor in the main circuit.

15. In a controller for electric motors, the combination with a motor, of a controller shaft, means for operating said shaft, reversing means for said motor controlled by said shaft, a contact arm controlled by said shaft, solenoids controlled by said contact arm, and a variable resistance in circuit with said motor and controlled by said solenoids.

In testimony that I claim the foregoing I have hereunto set my hand at Milwaukee in the county of Milwaukee and State of Wisconsin in the presence of two witnesses.

JNO. DILLON.

Witnesses:
N. E. OLIPHANT,
GEO. W. YOUNG.